(12) United States Patent
Wang et al.

(10) Patent No.: US 6,647,140 B1
(45) Date of Patent: Nov. 11, 2003

(54) SPECTRUM INVERTER APPARATUS AND METHOD

(75) Inventors: Shen-Ge Wang, Fairport, NY (US); Gaurav Sharma, Webster, NY (US)

(73) Assignee: Bank One, Chicago, IL (US)

( * ) Notice: Subject to any disclaimer, the term of this patent is extended or adjusted under 35 U.S.C. 154(b) by 0 days.

(21) Appl. No.: 09/313,735

(22) Filed: May 18, 1999

(51) Int. Cl.⁷ .............. G06K 9/00; H04N 1/04; G03F 3/08
(52) U.S. Cl. .............. 382/162; 156/155; 156/157; 156/158; 156/167; 358/487; 358/523; 358/518
(58) Field of Search .............. 356/326–330, 356/351, 354, 356, 428–430; 235/380–386, 462.01, 462.02, 472.01, 472.03; 358/1.9, 515, 518, 523, 524, 525, 487; 382/156, 155, 157, 158, 162, 167, 164; 706/20, 25, 26, 23

(56) References Cited

U.S. PATENT DOCUMENTS

| | | | |
|---|---|---|---|
| 5,351,079 A | * 9/1994 | Usui | 348/223.1 |
| 5,367,387 A | 11/1994 | Yamaguchi | 358/518 |
| 5,420,979 A | 5/1995 | Madden et al. | 395/162 |
| 5,543,940 A | * 8/1996 | Sherman | 358/518 |
| 5,640,002 A | * 6/1997 | Ruppert et al. | 235/472 |
| 5,754,184 A | 5/1998 | Ring et al. | 345/431 |
| 5,771,311 A | 6/1998 | Arai | 382/162 |
| 5,867,265 A | * 2/1999 | Thomas | 356/328 |
| 6,111,645 A | * 8/2000 | Tearney et al. | 356/354 |
| 6,211,971 B1 | * 4/2001 | Specht | 358/1.9 |
| 6,232,954 B1 | * 5/2001 | Rozzi | 345/150 |

OTHER PUBLICATIONS

Donald F. Specht (IEEE, 1991, "A general regression neural network").*

* cited by examiner

Primary Examiner—Andrew W. Johns
Assistant Examiner—Amir Alavi

(57) ABSTRACT

A spectrum inverter receives optical values from a scanning device and applies a spectrum inversion method to the optical values. The spectrum inversion method is selected based on a medium identifier that identifies the medium upon which the scanned image is formed. The resulting spectral space values are then output and may be used by an image output device to reproduce the scanned image.

21 Claims, 3 Drawing Sheets

SPECTRUM INVERTER APPARATUS AND METHOD

BACKGROUND OF THE INVENTION

1. Field of Invention

This invention is directed to spectrum inverter apparatus and methods that provide a full spectrum representation of the true color of an image based on input color values and a medium identifier.

2. Description of Related Art

When images are reproduced using conventional scanning processes, the resulting reproduction of an image is not an accurate reproduction of the original image. This is because the scanning devices use a limited color space. For example, spectral reflectance values, i.e. the actual color values reflected from or through the surface of the image, may be represented by a 36-dimensional spectral space while the scanner devices are limited to using a 3-dimensional color space, such as CIE Lab, RGB (red, green, blue), or the like. Thus, different image values in the 36-dimensional spectral space may be mapped to the same 3-dimensional color space values. This is known as metamerism.

Thus, due to metamerism, an image that is scanned by a scanning device does not completely represent the actual physical image. Furthermore, the reproduced image does not completely represent the original image, since many of the image values in the 36-dimensional spectral space have been lost during scanning of the image.

SUMMARY OF THE INVENTION

This invention is directed to spectrum inverter methods and apparatus. The spectrum inverter receives optical values, such as scanned input color values, from a scanning device and applies a spectrum inversion method to the optical values. The spectrum inversion method is selected based on a medium identifier that identifies the medium upon which the scanned image is formed. The resulting spectral space values are then output and may be used by an image output device to reproduce the scanned image.

In one exemplary embodiment of the spectrum inversion apparatus and methods of this invention, the spectrum inversion is implemented using a neural network that has three input layer nodes, ten hidden layer nodes, and thirty six output layer nodes. The optical values received from the scanning device are input into the input layer nodes and are inverted by the hidden and output layer nodes to output a 36-dimensional spectral space representation of the optical values. The weights of the nodes in the neural network are selected based on stored weight information corresponding to the medium identified by the medium identifier. These weights may be determined based on training the neural network using training data. Thus, a different set of weights may be used depending on the particular medium of the scanned image.

The medium identifier may be an alphanumeric identifier and may have a hierarchical arrangement. Thus, particular sub-categories of medium may be identified by various levels of the hierarchical medium identifier.

In this way, the spectrum inversion apparatus and methods of this invention may accurately reproduce a scanned image by obtaining spectral space image values from a limited color space representation of the scanned image. Thus, the effects of metamerism may be reduced. These and other features and advantages of the invention will be described in greater detailed hereinbelow.

BRIEF DESCRIPTION OF THE DRAWINGS

The exemplary embodiments of this invention will be described in detail with reference to the following figures, wherein like numerals designate like elements, and wherein.

DETAILED DESCRIPTION OF PREFERRED EMBODIMENTS

Figure 1:
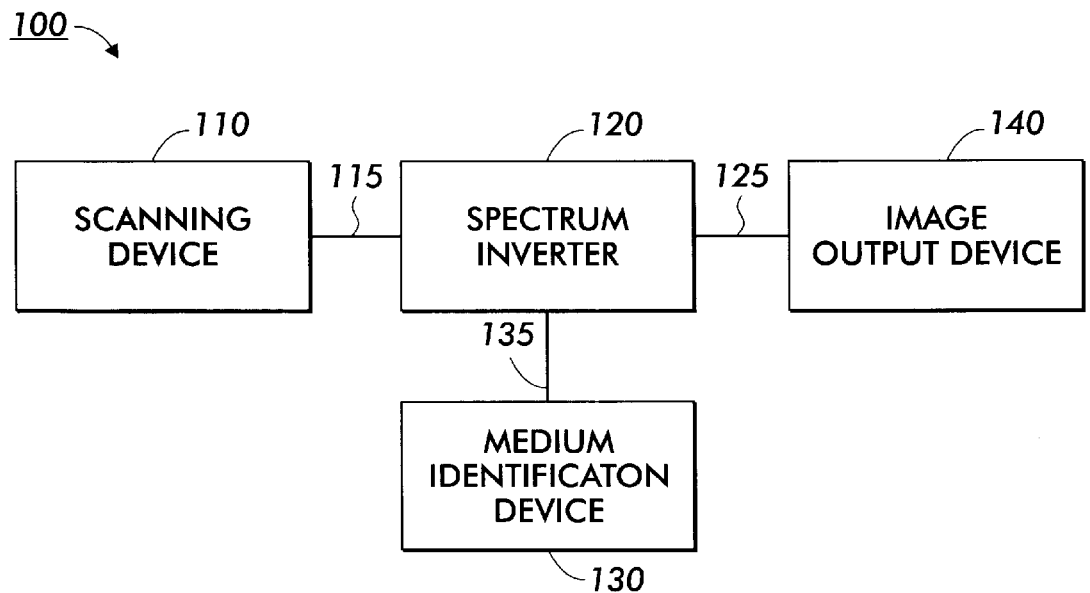
FIG. 1 is an exemplary block diagram of a reproduction system incorporating the spectrum inversion apparatus of this invention.

FIG. 1 illustrates one exemplary embodiment of a reproduction system 100 incorporating a spectrum inversion apparatus according to this invention. This exemplary embodiment will be explained with regard to an image scanning device. However, the concepts of this invention may be used with any device that reproduces an image by detecting color values of an original image. Such devices may include analog photocopying devices, digital photocopying devices, digital cameras, computers, or any other known or later developed image reproduction device.

The reproduction system 100 includes a scanning device 110, a spectrum inverter 120, a medium identification device 130, and an image output device 140. These elements 110–140 may be incorporated into a single device or may be distributed into a number of different devices. The elements may be grouped in any manner that is advantageous for the particular application to which the invention is being applied. For example, the scanning device 110 may be a stand alone device, while the spectrum inverter 120, the medium identification device 130 and the image output device 140 are integrated into a single device. Other groupings of the elements 110–140 may be made without departing from the spirit and scope or the present invention.

The elements 110–140 are connected via communication links 115, 125 and 135, which allow for the transfer of data between the elements 110–140. These communication links may be wired or wireless, serial or parallel connections, local area networks (LANs), wide area networks (WANs), intranets, the Internet, or any other known or later developed communication links that provide a way of transferring data from one device to another. The communication links 115, 125 and 135 may also be incorporated into a single control/signal bus that connects each of the elements 110–140.

The scanning device 110 may be any known device that detects light transmitted through or reflected from the surface of an image and determines optical values from the detected light. For example, the scanning device 110 may include a computerized scanner, a photocopying machine, a digital camera, a node of a distributed network, or the like.

The scanning device 110 detects the light reflected from the surface of an image, or transmitted through an image, and determines optical values, e.g. scanned input color values, from the detected light in a conventional manner. These optical values are then provided to the spectrum inverter 120 via the communication link 115. Based on the optical values from the scanning device 110 and a medium identifier obtained from the medium identification device 130 via the communication link 135, the spectrum inverter 120 inverts the optical values from the scanning device 110 into reflectance values, i.e. spectral space values. The reflectance values are then provided to the image output device 140 via the communication link 125, to thereby generate a reproduction of the scanned image.

The medium identification device 130 may be any type of device that provides an indicator of the medium on which the image is stored. The medium may be, for example, photographic paper, lithographic paper, xerographic paper, film, transparency medium, or any other type of medium upon which an image may be formed.

The medium identifier device 130 identifies the medium of the image and sends an identifier to the spectrum inverter 120 via the communication link 135. The medium identifier device 130 may be as simple as a switch that is set by an operator of the reproduction system, may be a user interface through which a user may enter or select a medium of the image, or may be as complex as a device that automatically determines the medium without user input. An example of the latter device is described in commonly assigned and co-pending U.S. patent application Ser. No. 09/047,453 incorporated herein by reference in its entirety.

The medium identifier device 130 may further include a device, such as a bar code reader or the like, capable of determining a medium based on identification markings on the medium, such as a bar code, watermark, or the like. In such a case, the medium identification device 130 may also have access to the optical values from the scanning device 110 from which the medium identifier device 130 may identify the medium.

The image output device 140 may be any known device that is capable of producing an image. For example, the image output device 140 may include a printer device, a photocopying device, a computer monitor, a television device, a liquid crystal display device, and the like.

The spectrum inverter 120 receives the optical values from the scanning device 110 and the medium identifier from the medium identification device 130. Based on the medium identifier, the spectrum inverter 120 chooses an inversion method for inverting the optical values from the scanning device 110 into spectral space values, i.e. reflectance values. For example, the spectrum inverter 120 chooses an inversion method for inverting the 3-dimensional color space optical values from the scanning device 110 into 36-dimensional spectral space values.

The spectral space values are then output to the image output device 140 where they may be used in reproducing the original image. If the image output device 140 is capable of outputting the full 36-dimensional spectral space values, no further conversion is necessary. However, with most image output devices 140, some conversion may be necessary to convert the 36-dimensional spectral space values into a color space useable by the image output device 140. In this case, conversion functions, look-up tables, and/or the like may be used to convert the 36-dimensional spectral space values into a useable color space.

In one example embodiment, the conversion uses the knowledge of the viewing illuminant spectrum to convert the image from spectral space to CIE Lab. This allows the output device to produce a reproduction that matches the original physical image under the aforementioned viewing illuminant.

Figure 2:
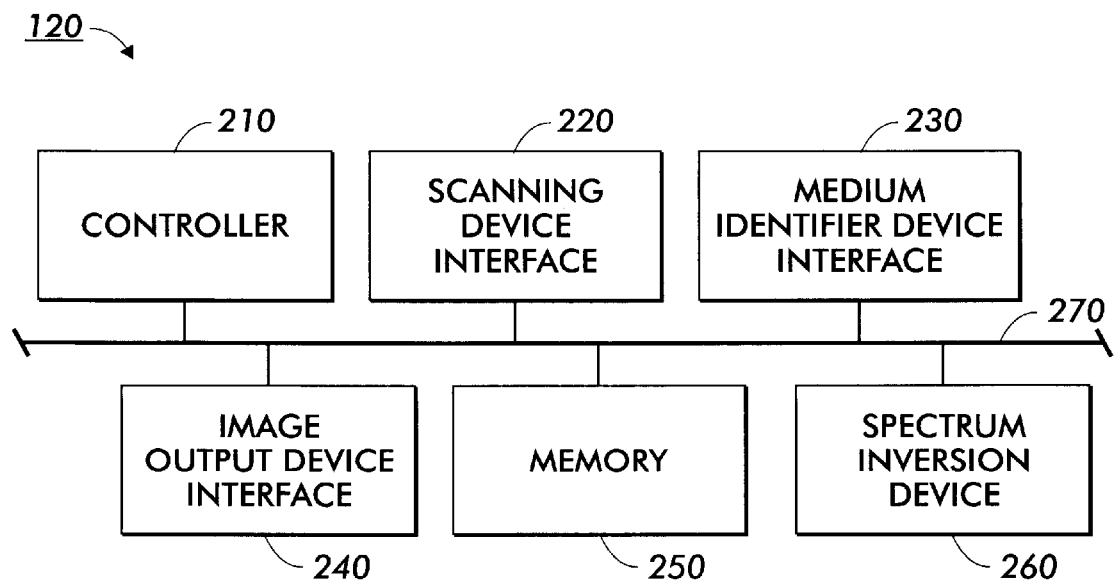
FIG. 2 is an exemplary block diagram of the spectrum inverter of FIG. 1.

FIG. 2 is an exemplary block diagram of the spectrum inverter 120 of FIG. 1. As shown in FIG. 2, the spectrum inverter 120 includes a controller 210, a scanning device interface 220, a medium identifier device interface 230, an image output device interface 240, a memory 250 and a spectrum inversion device 260. These elements are in communication with one another via a control signal bus 270. The control signal bus 270 may be replaced by any other suitable communication link.

When a medium having an image is scanned by the scanning device 110, the optical values determined from the detected light reflected from, or transmitted through, the surface of the image are transmitted to the spectrum inverter 120. The spectrum inverter 120 receives the optical values through scanning device interface 220 and stores the received optical values in the memory 250.

At some time before, during, or after scanning the medium, a medium identifier is received from the medium identifier device 130 through the medium identifier device interface 230. Based on the medium identifier, the controller 210 retrieves from the memory 250 a spectrum inversion method corresponding to the medium identifier. This spectrum inversion method may include look-up tables, a set of rules for an expert system, a set of weights for nodes of a neural network, program parameters, or the like.

Once the spectrum inversion method is retrieved from the memory 250, the controller 210 inputs the spectrum inversion method into the spectrum inversion device 260. The controller 210 also inputs the optical values of the scanned image, received from the scanning device 110 and stored in the memory 250, into the spectrum inversion device 260. The spectrum inversion device 260 operates based on the input spectrum inversion method to convert the optical values into 36-dimensional spectral space values. In other words, the spectrum inverter 120, and particularly spectrum inversion device 260, performs the retrieved spectrum inversion method on the received optical values. In this way, the optical values are converted from, for example, a 3-dimensional color space into a 36-dimensional spectral space while taking into consideration the particular medium upon which the original image is formed. It should also be appreciated that, if the medium identifier is available before or just as the optical values are received from the scanning device, it is not necessary to store the optical values in the memory 250.

The resulting 36-dimensional spectral space values may then be sent to the image output device 140 for reproduction of the image or may be stored in a storage device (not shown) for later use. If the image is to be reproduced, the output device 140 may reproduce the image using the 36-dimensional spectral space values with or without conversion into another color space, depending on the capabilities of the output device 140.

In this way, the spectrum inversion apparatus of this invention are capable of converting an image represented by a limited color space into a spectral space that more closely represents the actual physical image. This conversion is possible by using medium indicators that are used to select a particular spectrum inversion method. Thus, the negative effects of metamerism are reduced.

As described above, the spectrum inverter 120 receives, from the medium identification device 130, a medium identifier that identifies the medium on which the image is stored. The medium identifier may be an alphanumeric identifier, for example, that identifies the medium. For example, "M1," "1" or "photographic," may represent a photographic medium. Similarly, "M2," "2" or "xerographic," may represent a xerographic medium.

Further, in order to obtain even greater accuracy in the conversion of optical values into spectral space values, the medium identifier may be arranged in a hierarchical manner to thereby identify categories and sub-categories of medium. For example, the medium identifier "1.1.1" or "photographic.kodak.kodacolor" may represent a kodacolor™ kodak™ photographic medium.

With such a medium identifier, the controller 210 of the spectrum inverter 120 may retrieve a spectrum inversion method from the memory 250 corresponding to kodacolor™ kodak™ photographic medium. If such a spectrum inversion method is not available, the controller 210 may then retrieve a kodak™ photographic medium spectrum inversion method. If such a method is again not available, the controller 210 may then retrieve a photographic medium spectrum inversion method. If none of the spectrum inversion methods are available, default methods may be used for spectrum inversion.

Figure 3:
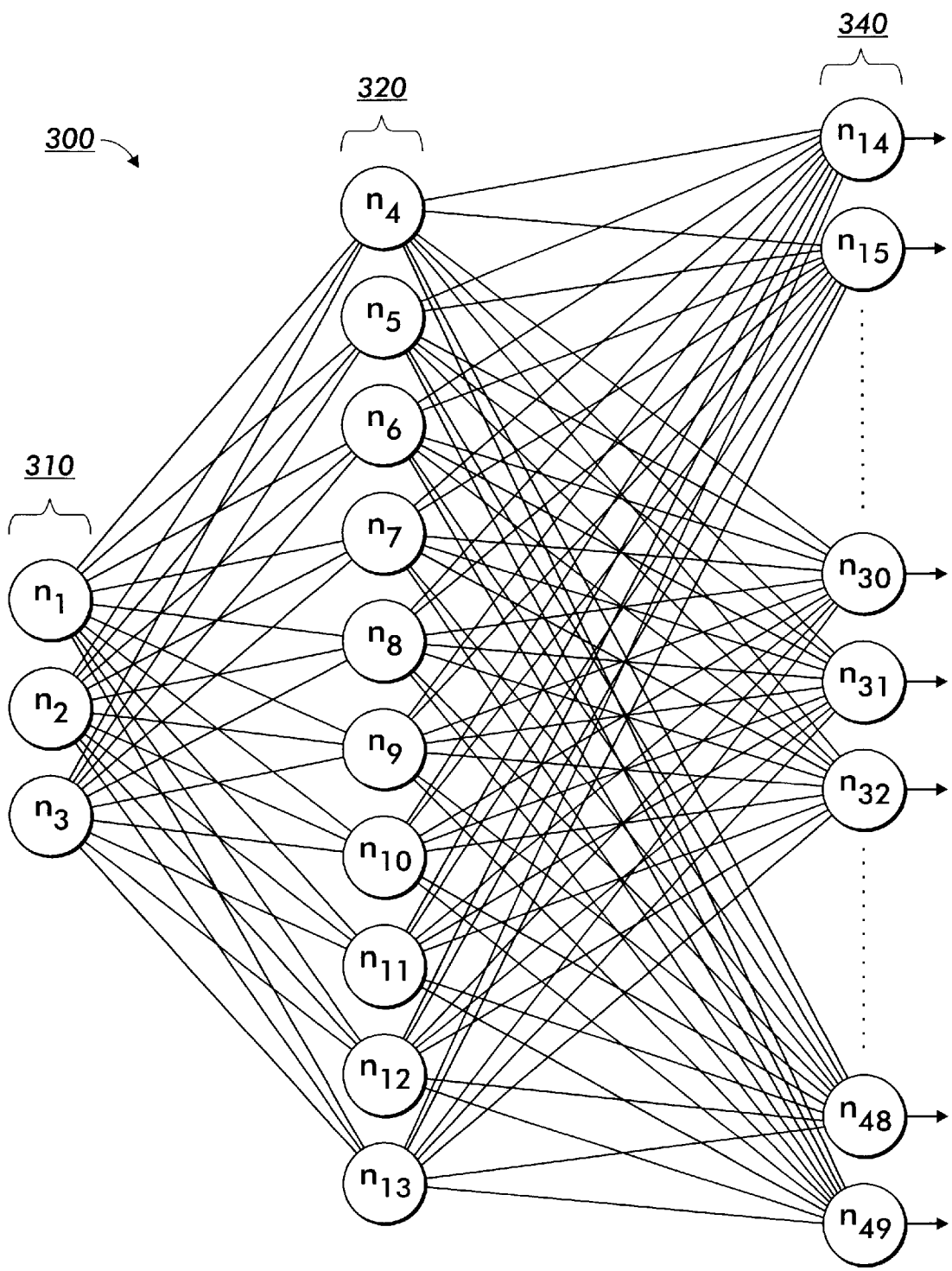
FIG. 3 is an exemplary diagram of a neural network embodiment of the spectrum inversion device of FIG. 2.

FIG. 3 shows one exemplary embodiment of the spectrum inversion device 260 of FIG. 2. While FIG. 3 shows the spectrum inversion device 260 as a neural network 300, other types of spectrum inversion devices 260 may be used without departing from the spirit and scope of the present invention. For example, an expert system, a fuzzy logic system, a computer program or a series of computer programs, or the like, may be used in place of or in conjunction with the neural network shown in FIG. 3.

As shown in FIG. 3, the neural network 300 includes an input layer 310 comprising three input nodes $n_1$–$n_3$, a hidden layer 320 comprising ten hidden nodes $n_4$–$n_{13}$, and an output layer 340 comprising thirty-six output nodes $n_{14}$–$n_{49}$. The three input nodes $n_1$–$n_3$ represent the three color input optical values, which may be, for example, CIE Lab values. The thirty-six output nodes $n_{14}$–$n_{49}$ represent the spectral components of the 36-dimensional spectral space value. In this particular exemplary embodiment, each of the hidden nodes $n_4$–$n_{13}$, mathematically, is represented by a hyperbolic tangent function, although other known or later developed functions may be used without departing from the spirit and scope of the invention.

With the above arrangement, the connections between the input nodes $n_1$–$n_3$ and the hidden nodes $n_4$–$n_{13}$ may be represented by a 3×10 matrix. The connections between the hidden nodes $n_4$–$n_{13}$ and the output nodes $n_{14}$–$n_{49}$ may be represented as a 10×36 matrix. The entries of the 3×10 matrix and the 10×36 matrix are determined to minimize a merit function. In this particular exemplary embodiment, the merit function is a weighted root-mean-square (RMS) spectral error, defined as:

$$Q = \sum \sum_{i=1}^{36} w(\lambda_i) * (R_{desired}(\lambda_i) - R_{output}(\lambda_i))^2 \quad (1)$$

where:
the summation is over all 36 spectral samples and all training samples;
$\lambda_i$, i=1, 2, . . . , 36 are the sampling wavelengths;
Q is the merit function;
$R_{desired}(\lambda_i)$ and $R_{output}(\lambda_i)$ are the spectral reflectance of the desired output and the actual output; and
$w(\lambda_i)$ is a weight. The weight $w(\lambda_i)$ may be obtained, for example, by the function:

$$w(\lambda_i) = x(\lambda_i) + y(\lambda_i) + z(\lambda_i) \quad (2)$$

where $x(\lambda_i)$, $y(\lambda_i)$ and $z(\lambda_i)$ are the CIE XYZ color matching functions that are reasonably related to human eye's color sensitivity to various color wavelengths. Other known or later developed merit functions and weight functions may be used without departing from the spirit and scope of this invention. For example, the merit function $w(\lambda_i)=\max(x(\lambda_i)+y(\lambda_i)+z(\lambda_i))$ or the like may be used in place of equation (2).

The optimum neural network weights for various different media may be obtained through a training process in which training data are input into the neural network and the weights are adjusted based on a comparison of the output node values to desired output values. For example, the output spectrum values from the output nodes may be converted into CIE Lab values and then compared against the input CIE Lab values to determine an error. The error may then be used to adjust the weights of the nodes.

Figure 4:
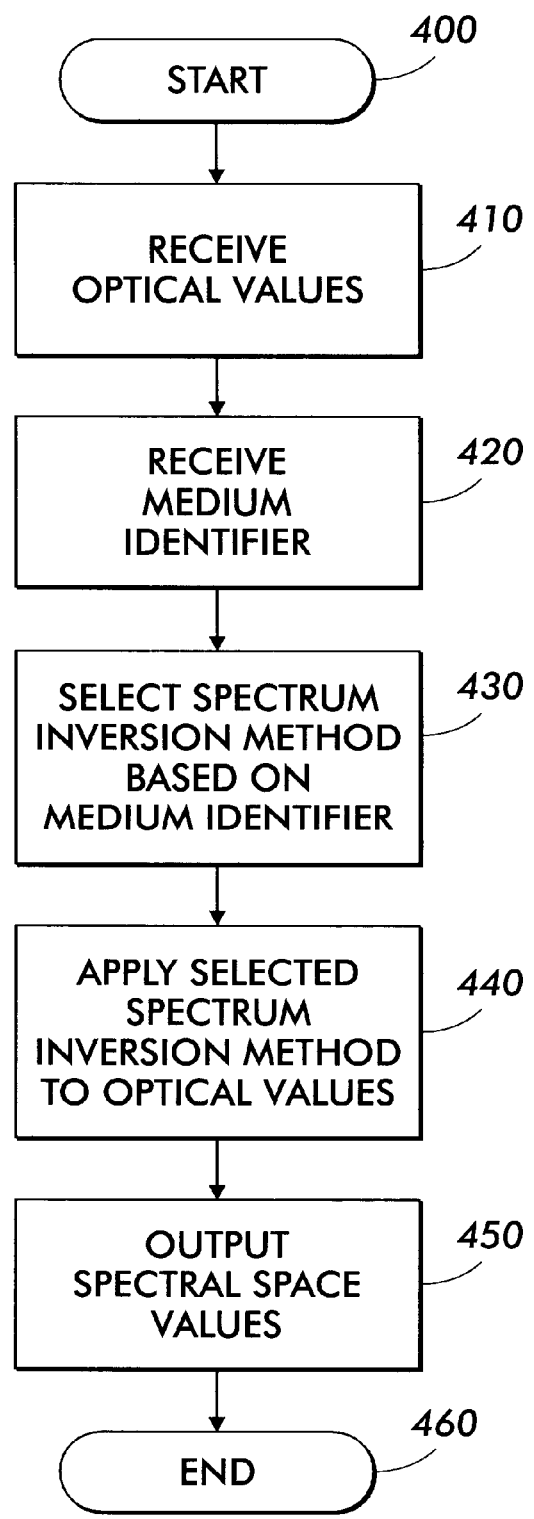
FIG. 4 is a flowchart outlining an exemplary embodiment of the spectrum inversion methods of this invention.

FIG. 4 is a flowchart outlining one exemplary embodiment of the spectrum inversion methods of this invention. Beginning in step 400, control continues to step 410 where optical values of the scanned image are received. Then, in step 420, a medium identifier is received. It should be appreciated that steps 410 and 420 may be performed in any order or may be performed simultaneously. Next, in step 430, a spectrum inversion method is selected based on the medium identifier. Control then continues to step 440.

In step 440, the selected spectrum inversion method is applied to the received optical values. Next, in step 450, the resulting spectral space values are output. Then, in step 460, the spectrum inversion operation ends.

With the above outlined spectrum inversion apparatus and methods, the spectral space values of scanned images may be determined from a limited color space representation of the images. In this way, metamerism effects are reduced and a more accurate representation and reproduction of the scanned images is obtained.

The spectrum inverter 120 described above may be implemented in software or hardware. For example, the spectrum inverter 120 may be a "plug-in" type device that may be plugged into a scanning device or other type reproduction device.

Furthermore, while the invention is described above with regard to a medium identifier, other types of identifiers may be used in replacement of or in addition to the medium identifier. For example, an identifier indicating monitor calibrations, printer models, scanner models, and the like, may be used to select an appropriate spectrum inversion method.

In addition to reproducing the scanned image, additional effects may be added to the reproduced image based on the spectrum inversion method. For example, the medium identifier may include further hierarchical identifiers that represent various effects that are to be applied to the resulting reproduced image. For example, an identifier may be appended to the medium identifier indicating that special illumination effects, filtering effects, and the like, are to be added to the resulting reproduced image.

While the spectrum inversion apparatus and methods of this invention are described with reference to a 3-dimensional input color space and a 36-dimensional output spectral space, the invention is not limited to such representations. Rather, any input color space and output spectral space may be used without departing from the spirit and scope of this invention.

Additionally, while the above description of the spectrum inversion apparatus and methods are directed to reproducing an image, the actual reproduction of the image is not a necessary element of the present invention. For example, the spectrum inversion of optical values may be performed and the spectral space values stored in memory for internal use by a computing device. For example, the spectral space values may be used for authentication purposes, identification purposes and the like, without requiring actual reproduction of the scanned image.

As shown in FIGS. 1 and 2, the spectrum inverter 120 may be implemented on a general purpose or special purpose computer. However, the spectrum inverter 120 can also be implemented on a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which a finite state machine capable of implementing the flowchart shown in FIG. 4 can be used to implement the spectrum inverter 120 of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. An apparatus that inverts the spectrum of image data, comprising:

an image data input device that inputs image data of an input image in an input color space;

a medium identification device that identifies an input image medium from which the input image data was obtained; and a spectrum inversion device that selects one of a plurality of spectrum inversion methods to convert the input image data into output image data in a spectral space based on the identification of the input image medium, the spectrum inversion device including a neural network, wherein the neural network includes input nodes, hidden nodes and output nodes, connections between the input nodes and the hidden nodes are represented by a 3×10 matrix, connections between the hidden nodes and the output nodes are represented by a 10×36 matrix, entries of the 3×10 matrix and the 10×36 matrix are determined to minimize a merit function, the merit function is a weighted root-mean-square (RMS) spectral error defined as:

$$\sum \sum_{i=1}^{36} w(\lambda i) * (R_{desired}(\lambda i) - R_{output}(\lambda i))^2$$

where $\lambda i$, i=1, 2, ..., 36 are sampling wavelengths, $R_{desired}(\lambda i)$ and $R_{output}(\lambda i)$ are the spectral reflectance of desired output and actual output, and $w(\lambda i)$ is a weight factor.

2. The apparatus of claim 1, wherein the image data input device includes at least one of a scanning device, a photocopying device, a digital camera and a node of a distributed network.

3. The apparatus of claim 1, wherein the medium identification device includes at least one of a switch and a user interface.

4. The apparatus of claim 1, wherein the medium identification device outputs to the spectrum inversion device a medium identifier that identifies the input image medium.

5. The apparatus of claim 4, wherein the medium identifier is a hierarchical identifier representing categories and sub-categories of the identified input image medium.

6. The apparatus of claim 5, wherein the medium identifier further includes sub-categories representing effects that are to be applied to the input image data.

7. The apparatus of claim 5, wherein the medium identifier further includes calibration data identification.

8. The apparatus of claim 1, wherein the spectrum inversion device selects a spectrum inversion method from a plurality of spectrum inversion methods based on the identification of the input image medium.

9. The apparatus of claim 8, wherein the spectrum inversion method includes at least one of a look-up table, a set of rules for an expert system, a set of weights for a neural network, a program, and a series of programs.

10. A method for inverting the spectrum of image data, comprising:

inputting image data of an input image, the image data being in an input color space;

identifying an input image medium from which the image data was obtained;

selecting one of a plurality of spectrum inversion methods based on the identification of the input image medium; and converting the input image data into output image data using a neural network, the output image data being in a spectral space, wherein the neural network includes input nodes, hidden nodes and output nodes, connections between the input nodes and the hidden nodes are represented by a 3×10 matrix, connections between the hidden nodes and the output nodes are represented by a 10×36 matrix, entries of the 3×10 matrix and the 10×36 matrix are determined to minimize a merit function, the merit function is a weighted root-mean-square (RMS) spectral error defined as:

$$\sum \sum_{i=1}^{36} w(\lambda i) * (R_{desired}(\lambda i) - R_{output}(\lambda i))^2$$

where $\lambda i$, i=1, 2, ..., 36 are sampling wavelengths, $R_{desired}(\lambda i)$ and $R_{output}(\lambda i)$ are the spectral reflectance of desired output and actual output, and $w(\lambda i)$ is a weight factor.

11. The method of claim 10, wherein the input image data are input from at least one of a scanning device, a photocopying device, a digital camera, and a node of a distributed network.

12. The method of claim 10, wherein identifying the input image medium includes at least one of the setting a switch to a particular input image medium setting and selecting an input image medium using a user interface.

13. The method of claim 10, wherein identifying an input image medium includes determining a medium identifier that identifies the input image medium.

14. The method of claim 13, wherein the medium identifier is a hierarchical identifier representing categories and sub-categories of medium.

15. The method of claim 14, wherein the medium identifier further includes sub-categories representing effects that are to be applied to the input image data.

16. The method of claim 14, wherein the medium identifier further includes calibration data identification.

17. The method of claim 10, wherein converting the input image data into output image data includes selecting a spectrum inversion method from a plurality of spectrum inversion methods based on the identification of the input image medium.

18. The method of claim 17, wherein the spectrum inversion method includes at least one of a look-up table, a set of rules for an expert system, a set of weights for a neural network, a program, and a series of programs.

19. The apparatus of claim 1, wherein the spectrum inversion device selects a spectrum inversion method from a plurality of spectrum inversion methods based on the identification of the input image medium.

20. The method of claim 10, further comprising:

selecting a spectrum inversion method from a plurality of inversion methods based on the identification of the input image medium.

21. The apparatus of claim 1, wherein the input image data contains a 3-dimensional input color space, and the output image data contains a 36-dimensional spectral space.

* * * * *

UNITED STATES PATENT AND TRADEMARK OFFICE
CERTIFICATE OF CORRECTION

PATENT NO. : 6,647,140 B1  
DATED : November 11, 2003  
INVENTOR(S) : Shen-Ge Wang et al.

It is certified that error appears in the above-identified patent and that said Letters Patent is hereby corrected as shown below:

Title page,
Item [73], should read as follows:
-- [73] Assignee: Xerox Corporation, Stamford, CT (US) --

Signed and Sealed this

Ninth Day of March, 2004

JON W. DUDAS
*Acting Director of the United States Patent and Trademark Office*